US009825705B2

(12) United States Patent
Jain

(10) Patent No.: US 9,825,705 B2
(45) Date of Patent: Nov. 21, 2017

(54) SYSTEMS AND METHODS FOR SHARING OF OPTICAL NETWORK TERMINALS IN PASSIVE OPTICAL NETWORK

(71) Applicant: STERLITE NETWORKS LIMITED, Dadar Nagar Haveli (IN)

(72) Inventor: Vijay Jain, Banglore (IN)

(73) Assignee: STERLITE NETWORKS LIMITED, Dadar Nagar (IN)

( * ) Notice: Subject to any disclaimer, the term of this patent is extended or adjusted under 35 U.S.C. 154(b) by 75 days.

(21) Appl. No.: 14/367,900

(22) PCT Filed: Dec. 20, 2012

(86) PCT No.: PCT/IB2012/057527
§ 371 (c)(1),
(2) Date: Jun. 21, 2014

(87) PCT Pub. No.: WO2013/093833
PCT Pub. Date: Jun. 27, 2013

(65) Prior Publication Data
US 2014/0369688 A1 Dec. 18, 2014

(30) Foreign Application Priority Data

Dec. 21, 2011 (IN) .......................... 3595/MUM/2011

(51) Int. Cl.
*H04B 10/25* (2013.01)
*H04J 14/02* (2006.01)
(Continued)

(52) U.S. Cl.
CPC .......... *H04B 10/25* (2013.01); *H04J 14/0232* (2013.01); *H04J 14/0235* (2013.01);
(Continued)

(58) Field of Classification Search
None
See application file for complete search history.

(56) References Cited

U.S. PATENT DOCUMENTS

2006/0285529 A1* 12/2006 Hares ...................... H04L 45/16
370/338
2007/0201872 A1* 8/2007 Yim .................... H04L 12/2832
398/66

(Continued)

OTHER PUBLICATIONS

Chowdhury, et al., "Hybrid Wireless-Optical Broadband Access Network (WOBAN): Prototype Development and Research Challenges", Univ. of California, Davis, CA, IEEE Network (Impact Factor: 2.54). Jul. 2009; 23(3):41-48. DOI: 10.1109/MNET.2009. 4939262.*

*Primary Examiner* — Darren E Wolf

(57) ABSTRACT

The system of the present invention includes a plurality of ONTs adapted to provide multiple voice and data related services to different subscribers. Each of the plurality of ONTs comprises at least one receiver adapted to receive optical signals, a de-multiplexer to de-multiplex the optical signal into component signals, at least one transmitter and at least one output port. Further, the system includes a plurality of routers operatively coupled to the each of the plurality of ONTs. Furthermore, the system includes a plurality of subscriber devices communicably coupled to each of the plurality of routers. The subscriber devices are adapted to receive the de-multiplexed component signals routed by the corresponding router and provide data and voice services to the particular subscriber. Each of the ONTs configures separate domains for each of the routers operatively coupled thereto so as to enable sharing of the ONT.

13 Claims, 4 Drawing Sheets

(51) Int. Cl.
  *H04L 12/64* (2006.01)
  *H04Q 11/00* (2006.01)
  *H04L 12/46* (2006.01)
  *H04L 12/761* (2013.01)

(52) U.S. Cl.
  CPC ...... *H04J 14/0246* (2013.01); *H04J 14/0282* (2013.01); *H04L 12/6418* (2013.01); *H04Q 11/0067* (2013.01); *H04L 45/16* (2013.01); *H04Q 11/0071* (2013.01)

(56) References Cited

U.S. PATENT DOCUMENTS

| | | | |
|---|---|---|---|
| 2007/0223493 A1* | 9/2007 | Sridhar | H04L 12/1886 370/395.53 |
| 2009/0238561 A1 | 9/2009 | Huang et al. | |
| 2010/0226649 A1 | 9/2010 | Cheng et al. | |
| 2010/0309932 A1 | 12/2010 | Diab et al. | |
| 2012/0281984 A1* | 11/2012 | Iannone | H04B 10/2914 398/68 |

* cited by examiner

SYSTEMS AND METHODS FOR SHARING OF OPTICAL NETWORK TERMINALS IN PASSIVE OPTICAL NETWORK

TECHNICAL FIELD

This invention relates to the field of optical networks, and more particularly, to passive optical networks (PONs) capable of providing increased number of services at subscriber's premises by optimal utilization of the Optical network terminals (ONTs).

BACKGROUND ART

Passive optical networks (PONs) are commonly used in the present world for providing a variety of services, like telephony, cable television and internet, simultaneously to subscribers. A PON consists of an Optical line termination (OLT) at a service provider's office and a number of Optical Network Terminals (ONTs) near end users. The ONTs de-multiplex the optical signals received from the service provider into its various components, viz. telephony, cable television and data. The optical signals are transmitted to the ONTs through a fibre optic cable while the de-multiplexed component signals from the ONTs are transmitted to the subscriber's home by using various output cables, such as CAT 6, RJ-11 and the like, corresponding to the type of component signals.

The PON provides few peculiar advantages. Firstly, PON reduces the amount of fiber required, and local exchange and field equipment needed to provide multiple services. Secondly, PON does not require specific electronics as it replaces them with passive optical splitters. Further, since optical splitters of a PON do not require any power, the overall installation and operating cost is lowered. Thirdly, by removing a potential point of failure, namely the power supply, the risk of downtime is also reduced, making PON much more reliable. Therefore, there has been a very pertinent need to build on PON capabilities and improve it further.

One disadvantage in present day PONs is the limitation in utilising the full capacity thereof, which may be attributed to the underutilisation of all available ports on the ONT. For example, it has been observed that normally ONTs support 4 service ports. However, it has been observed that not all the ports are utilised by the subscribers. Further, it has been observed that not all the bandwidth available for providing services to the subscribers is utilized. Accordingly, there is available spare bandwidth which can be easily utilised for delivery of services to the subscribers in such PONs.

In today's world where the number of services required by the subscribers is increasing day by day, the problem is with limitation of ports and unused bandwidth in those ports. Therefore, it is imperative to determine a solution that traverse aforesaid problem of underutilization of ports on the ONT. One way to address the problem has been to install more and more ONTs near to the subscribers' premises. However, it will be apparent to persons skilled in the art that such solution increases the overall cost of the network overlay, thereby increasing the costs for the subscribers.

Accordingly, there is a need to develop systems and methods to circumvent aforesaid problems and provide to customers many more services as compared to the number of services provided by present day network architectures.

Particularly, there exists a need for optimal utilization of the ONTs being used in a PON such that services may be provided to a larger number of subscribers through each of the ONTs.

More particularly, there is a need for a better utilization of the resources and bandwidth available at the ONTs in a PON for enabling an increased number of subscribers to be serviced per ONT.

There also exists a need for an improved ONT that may be configured in a manner such that the resources and bandwidth thereof may be optimally utilized, thereby enabling servicing of an increased number of subscribers per ONT.

SUMMARY OF INVENTION

In view of the foregoing disadvantages inherent in the prior art, the general purpose of the present invention is to conveniently provide sharing of ONTs in a PON.

Accordingly, an object of the present invention is to provide systems and methods for providing increased number of services from multiple service providers to the subscribers.

Another object of the present invention is to better utilize the resources present in the present day network architectures.

Yet another object of the present invention is to lower per customer costs for providing the multiple services thereto.

Yet another object of the present invention is to provide better bandwidth as compared to other fixed line technologies.

Yet another object of the present invention is to improve the usage of Dynamic Bandwidth Allocation technology in the present PONs, especially at Gigabyte PON (GPON) levels.

These and other objects and advantages of the invention will be clear from the ensuing description.

In light of the above objects, disclosed is a system and method for sharing of optical network terminals in a passive optical network (PON).

The system of the present invention includes a plurality of ONTs adapted to provide multiple voice and data related services to different subscribers. Each of the plurality of ONTs comprises at least one receiver adapted to receive optical signals from service provider, a de-multiplexer coupled to the at least one receiver to de-multiplex the optical signal into component signals, at least one transmitter coupled to the de-multiplexer for transmitting the de-multiplexed component signals to subscribers and at least one output port. Further, the system includes a plurality of routers operatively coupled to the each of the plurality of ONTs. Each of the routers is adapted to route the de-multiplexed component signal, received from a corresponding ONT of the plurality of ONTs, to a particular subscriber. Furthermore, the system includes a plurality of subscriber devices communicably coupled to each of the plurality of routers. The subscriber devices is adapted to receive the de-multiplexed component signals routed by the corresponding router and provide data and voice services to the particular subscriber. The present invention envisages that each of the ONTs is adapted to configure at least one broadcast domain at the at least one output port thereof so as to enable sharing of the ONT.

In an embodiment of the present invention, each of the routers comprises at least one input port communicably coupled to the at least one output port of corresponding ONT of the plurality of ONT by a cable.

In another embodiment of the present invention, the cable is a CAT 5 cable.

In yet another embodiment of the present invention, the cable is a CAT 6 cable.

In still another embodiment of the present invention, the at least one broadcast domain comprises one or more virtual local area network (VLAN) domain.

In still another embodiment of the present invention, each of the ONTs is configured to implement VLAN trunking protocol at the at least one output port thereof so as to configure one or more VLANs.

In still another embodiment of the present invention, each of the plurality of routers is a wireless router.

In still another embodiment of the present invention, each of routers configures a service set identifiers (SSID) for identification thereof and enabling communication with the plurality of subscriber devices communicably coupled thereto.

Also, disclosed is an optical network terminal (ONT) capable of being used in a passive optical network. The ONT is adapted to provide multiple voice and data related services to different subscribers and includes at least one receiver adapted to receive optical signals from a service provider, a de-multiplexer coupled to the at least one receiver to de-multiplex the optical signal into component signals, at least one transmitter coupled to the de-multiplexer for transmitting the de-multiplexed component signals to subscribers and at least one output port communicably coupled to the at least one transmitter. The at least one output port is adapted to communicably couple the ONT to a plurality of routers. The ONT is adapted to configure at least one broadcast domain at the at least one output port thereof so as to enable sharing of the ONT In an embodiment of the present invention, the at least one broadcast domain comprises one or more virtual local area network (VLAN) domain at the at least one output port thereof.

In another embodiment of the present invention, the ONT is configured to implement VLAN trunking protocol at the at least one output port thereof so as to configure the one or more VLANs Moreover, disclosed is a method for sharing optical network terminals (ONTs) in Passive Optical network. The method includes providing a plurality of ONTs adapted to provide multiple voice and data related services to different subscribers. Each of the plurality of ONTs includes at least one receiver adapted to receive optical signals from service provider, a de-multiplexer coupled to the at least one receiver to de-multiplex the optical signal into component signals, at least one transmitter coupled to the de-multiplexer for transmitting the de-multiplexed component signals to subscribers and at least one output port. The method further includes providing a plurality of routers operatively coupled to the each of the plurality of ONTs through the at least one output port thereof and configuring at least one broadcast domain at the at least one output port of each of the ONTs so as to enable sharing of the ONT. The method also includes providing a plurality of subscriber devices communicably coupled to each of the plurality of routers and routing the de-multiplexed component signal, received from a corresponding ONT of the plurality of ONTs, to a particular subscriber through a corresponding router to a plurality of subscriber devices communicably coupled to the router. Finally, the method includes receiving the de-multiplexed component signals routed by the corresponding router and providing data and voice services to the particular subscriber.

In another embodiment of the present invention, configuring at least one broadcast domains comprises configuring one or more virtual local area network (VLAN) domain at the at least one output port of each of the ONTs.

In yet another embodiment of the present invention, configuring the one or more VLAN domain is facilitated by implementing VLAN trunking protocol at the at least one output port of each of the ONTs.

In still another embodiment of the present invention, the de-multiplexed component signal to the plurality of subscriber devices comprises configuring service set identifiers (SSIDs) at each of the plurality of routers for identification thereof and enabling communication with the plurality of subscriber devices communicably coupled thereto.

These aspects together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawing and descriptive matter in which there is illustrated an exemplary embodiment of the present invention.

BRIEF DESCRIPTION OF THE DRAWINGS

The advantages and features of the present invention will become better understood with reference to the following detailed description taken in conjunction with the accompanying drawings, in which.

Like reference numerals refer to like parts throughout the description of several views of the drawing.

DETAILED DESCRIPTION OF THE DISCLOSURE

The exemplary embodiments described herein detail for illustrative purposes are subject to many variations in structure and design. It should be emphasized, however, that the present invention is not limited to a particular system and method for sharing of optical network terminals in a passive optical network (PON) as described. It is understood that various omissions and substitutions of equivalents are contemplated as circumstances may suggest or render expedient, but these are intended to cover the application or implementation without departing from the spirit or scope of the present invention.

The terms "a" and "an" herein do not denote a limitation of quantity, but rather denote the presence of at least one of the referenced item.

The terms "having", "comprising", "including", and variations thereof signify the presence of a component.

The present invention provides systems and methods for sharing of optical network terminals (ONTs) in a passive optical network (PON). The examples of multiple services as mentioned herein include, but are not limited to, telephony, cable television, IP based services, such as internet services, VoIP services, and the like. It will be apparent to a person skilled in the art that the term 'subscribers' as mentioned herein refers to users of aforesaid services. The systems and methods will now be explained in conjunction with FIGS. 1-3 as below.

Figure 1:
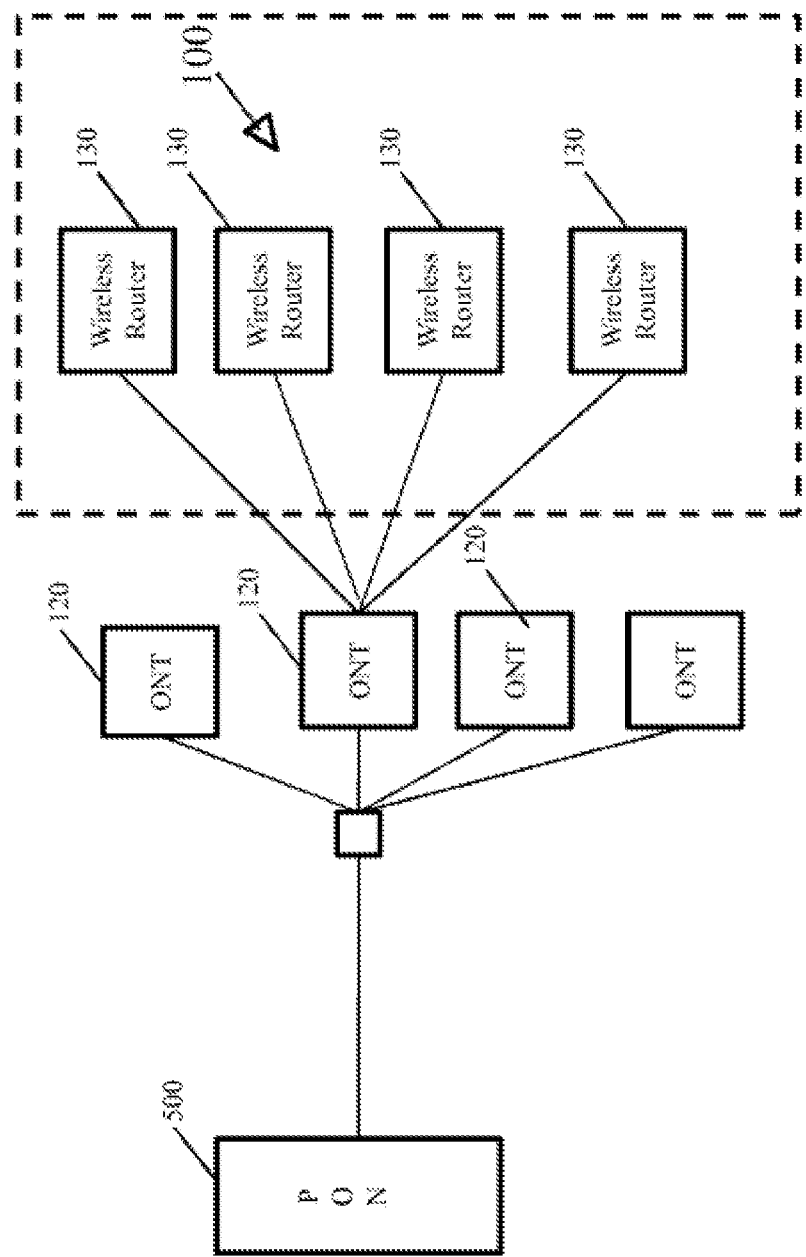
FIG. 1 illustrates a block diagram of a system for sharing of optical network terminals in a passive optical network (PON), in accordance with various embodiments of the present invention.
Figure 2:
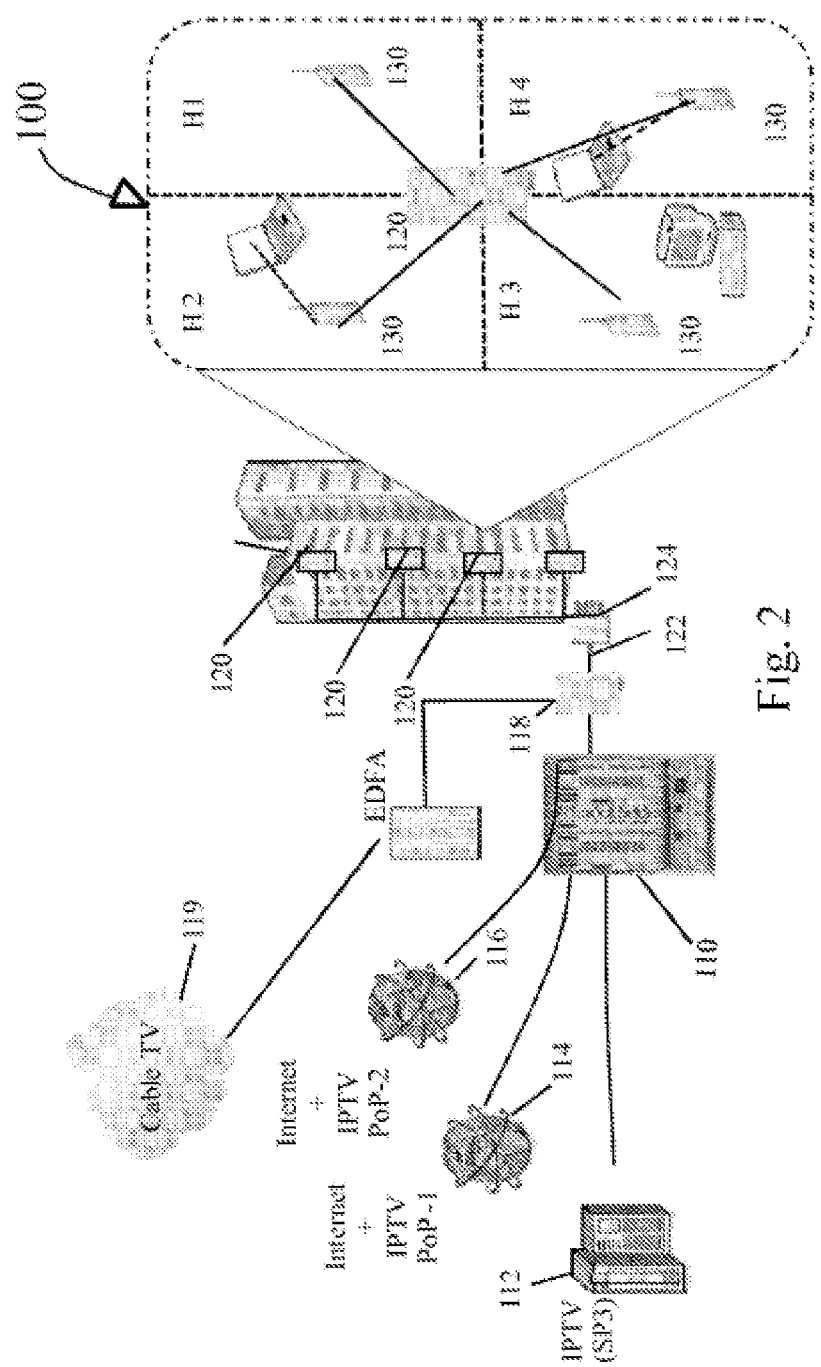
FIG. 2 is a schematic representation of the system of FIG. 1, in accordance with various embodiments of the present invention.

FIGS. 1 and 2 illustrate a system 100 for sharing of optical network terminals in a passive optical network (PON) 500. It will be understood that a typical PON 500 as mentioned herein consists of an Optical line terminal (OLT) 110 at a service provider's office and a number of Optical Network Terminals (ONTs) 120 near end users. The OLT 110 is configured to act as an end point for multiple IP based services, such as services 112, 114, 116 (FIG. 2) to which it is operatively coupled. The services 112, 114, 116 may be from same or different service providers.

As depicted in FIG. 2, the OLT 110 is configured to act as an end point for IPTV service 112 from a service provider SP3. Further, the OLT 110 is configured to act as an end point for Internet+IPTV services 114, 116 from different service providers via wired or wireless means. It will be apparent to persons skilled in the art that the wired or wireless means may operate on any standard data and content exchange protocols for enabling the transfer of data, content or services. More specifically, the OLT 110 may be configured to aggregate signals used by the service providers feeds into optical signals. Furthermore, the OLT 110 may be configured to coordinate the multiplexing between the various optical signals generated by the OLT 110.

Further, as shown in FIG. 2, the PON includes a Wave Division Multiplexer (WDM) 118 configured to act as an end point for non-IP based services, such as Cable TV service 119, and configured to aggregate the signals from OLT 110, multiplex and send optical signals corresponding to the aggregated signals via an optical channel 122.

The optical channel 122 is configured to transmit the signals downstream to one or more splitters 124 in operational association therewith. The one or more splitters 124 is configured to divide the optical signals received into various sub signals, which may be then fed to the ONTs 120, operatively coupled thereto and kept at subscriber's ends. The ONTs 120 de-multiplex the optical signals received from the service provider into its various components, viz. telephony, cable television and data.

To increase the number of services that are to be provided to the subscribers, the present invention envisages sharing of each of the ONTs 120 between multiple subscribers. Accordingly, the system 100 of the present invention includes a plurality of routers 130 configured in operational communication with each of the ONTs 120. Each of the routers 130 is adapted to route the de-multiplexed component signal of the ONTs 120 to a particular subscriber. The operational communication of the one or more routers 130 with the each of the ONTs 120 may be using wired means of suitable data sharing protocols. It is to be noted that each of the ONTs 120 include at least one output port that is communicably coupled to at least one input port on the router 130 by means of a cable. In an embodiment of the present invention, the cable may be a CAT 5 cable. In another embodiment of the present invention, the cable may be a CAT 6 cable. The communicable coupling between the ONTs and routers shall be explained later in conjunction with FIG. 3. Further, it should be clearly understood that in an embodiment, the system 100 may include any other access devices capable of functioning similar to the routers 130. For instance, the routers 130 may include wireless routers for transmitting signals wirelessly, in an exemplary embodiment of the present invention. The present invention shall be explained with reference to wireless routers, however, the scope of the present invention should not be construed to be limited to wireless routers only and use of any other type of routers would also lie within the scope of the present invention.

Further, each of the ONTs 120, as envisaged by the present invention, includes communication modules available in conventional ONTs besides the uniquely configured modules. Particularly, the conventional communication modules include at least one receiver adapted to receive optical signals from the service provider through their respective OLTs 110, and a de-multiplexer operatively coupled to the at least one receiver to de-multiplex the optical signals into its component signals. The ONTs 120 further include at least one transmitter coupled to the de-multiplexer for transmitting the de-multiplexed component signals to various subscribers. The ONTs 120 also include at least one output port communicably coupled to the at least one transmitter. The output port enables communicable coupling between the ONTs 120 and the routers 130, as will be explained in the ensuing paragraphs and in conjunction with FIG. 3.

Furthermore, the present invention envisages that each of the ONTs 120 is adapted to configure at least one broadcast domain at the at least one output port thereof for enabling sharing of the ONTs 120. Particularly, in an embodiment of the present invention, the at least one broadcast domain includes one or more virtual local network (VLAN) domains that are configured at the at least one output ports of each of the ONTs 120. More particularly, each of the ONTs 120 are configured to support Virtual Local Area Network (VLAN) Trunking protocols at its various output ports so as to enable the ONTs 120 to configure the one or more VLAN domains at each of the output ports thereof. It is to be noted that VLAN Trunking protocol is an Ethernet Standard Technology already defined in IEEE 802.3, and this protocol enables physical layer and data link layer's media access control (MAC) of wired Ethernet. Accordingly, a detailed description of said protocol is being avoided here for sake of brevity.

Further, consequent to the configuration of the one or more VLAN domains at each of the output ports, different services may be transmitted over each of the configured VLAN domains, thereby enabling services to be provided to a larger number of subscribers as compared to conventional ONTs.

Figure 3:
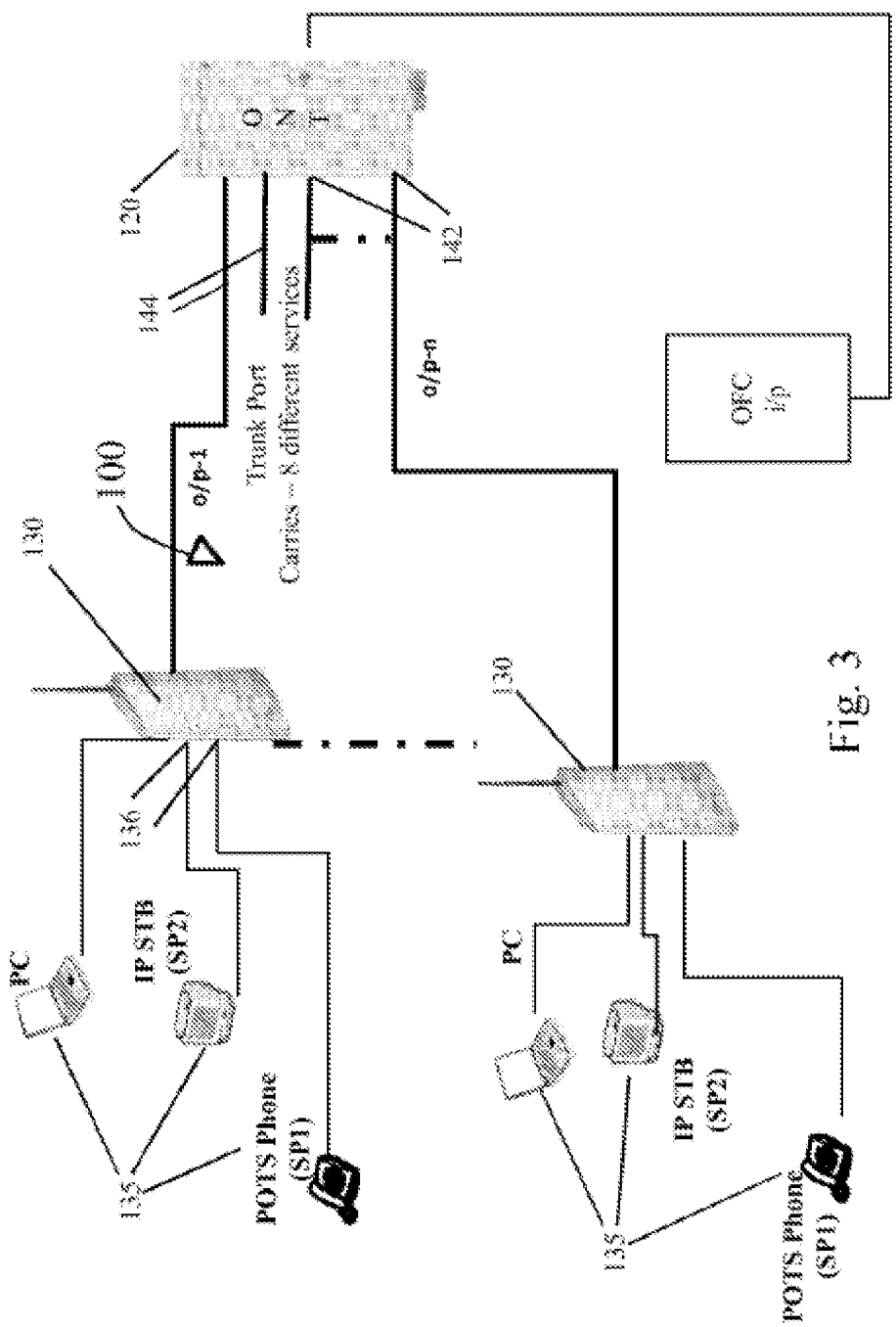
FIG. 3 is a schematic representation of the manner in which various wireless routers are operatively coupled to the ONTs, in accordance with various embodiments of the present invention.

The manner in which the ONT 120 is operatively coupled to the one or more wireless routers 130 will now be explained with reference to FIG. 3. As shown in FIG. 3, various output ports 142 of the ONT 120 are operatively coupled to input ports (not shown) of corresponding wireless routers 130 via cables 144. In one embodiment, the cables 144 are CAT 5 cables, and are operatively coupled to Ethernet ports, and more particularly RJ-45 ports, of the ONT 120. However, it should be understood that such means of coupling should not be in any ways construed as a limitation to the present disclosure. In an embodiment, the coupling may be enabled done via any other compliant cable, such as a CAT 6 cable, and the like. Referring again to FIG. 2, there is shown one ONT 120 being operatively coupled to 4 wireless routers 130 by means of cables. Each of the wireless routers 130 is installed in different subscriber's premises H1, H2, H3, and H4 respectively. This allows routing of various IP based services from the same ONT 120 to different subscriber's premises H1, H2, H3, H4, respectively, via the wireless router 130 installed at the respective locations. The routers 130 are communicably coupled to various subscriber devices over a physical or wireless medium. Further, each of the one or more routers 130 configure service set identifiers (SSIDs) at its various input ports for identification thereof and for enabling communication with plurality of subscriber devices. It is to be noted that different SSIDs are mapped to one or more VLANs so as to identify the different broadcast domains so formed. Each of the services to be provided to the subscribers may be provided on the corresponding VLAN which is identified by its separate SSID. In use, each of the output ports of the ONT 120 is coupled to input port of a router 130 for physically coupling the router 130 to the ONT 120. Further, different VLANS are configured at each of the output ports of the ONT 120, each of the VLAN being mapped to different SSIDs created at the input port of each of the routers 130.

Referring again to FIG. 2, there is shown one ONT 120 being operatively coupled to 4 wireless routers 130 by means of cables. Each of the wireless routers 130 is installed in different subscriber's premises H1, H2, H3, and H4 respectively. This allows routing of various IP based services from the same ONT 120 to different subscriber's premises H1, H2, H3, H4, respectively, via the wireless router 130 installed at the respective locations. The routers 130 are communicably coupled to various subscriber devices over a physical or wireless medium. As explained, the present invention envisages that the SSIDs are mapped to the different VLANs configured at the output ports 142 of the ONTs 120 for providing different services from various service providers.

Such operational coupling allows transmission of multiple services from the Ethernet ports 142 of the ONT 120, and delivered over access ports 136 of the routers 130 and various SSIDs of the wireless routers 130. The various access ports 136 are configured to serve the subscriber devices 135 via wired or wireless means, as shown in FIG. 3.

Figure 4:
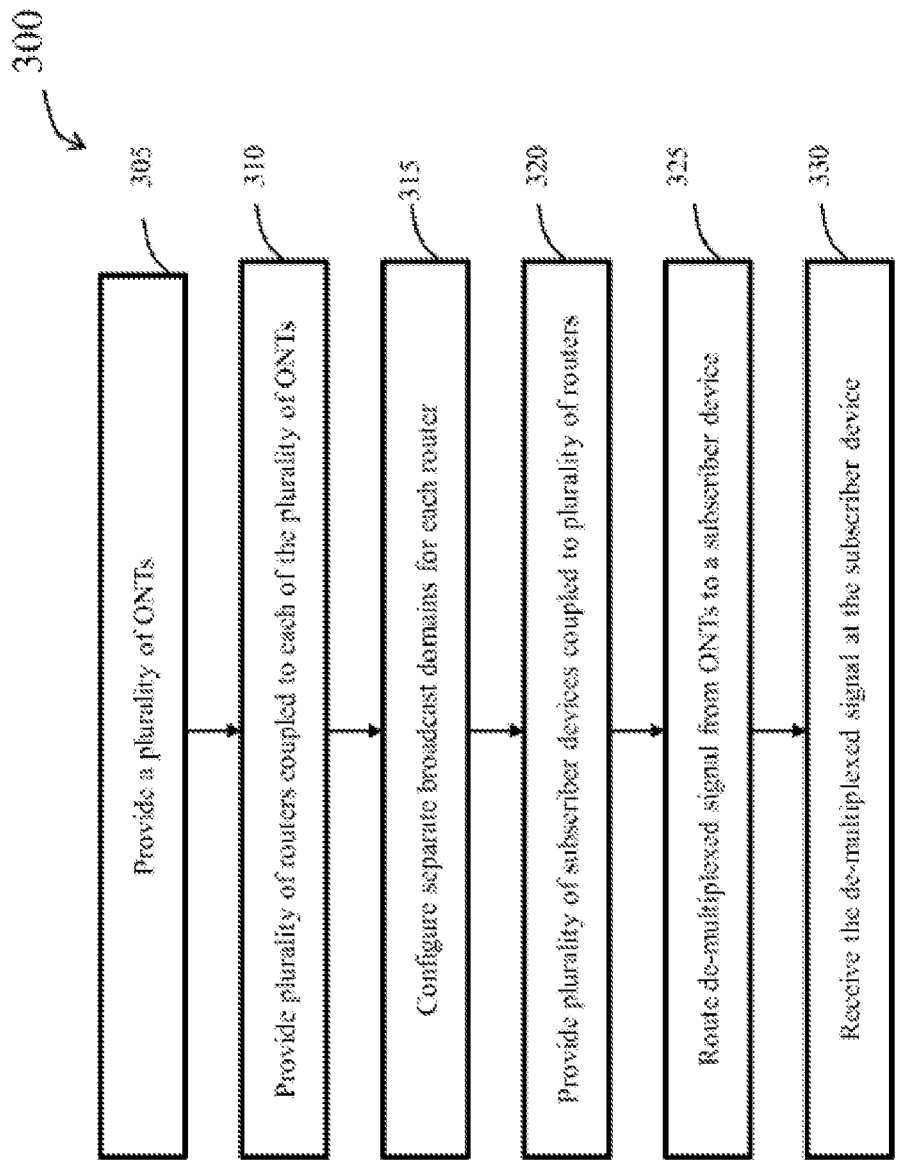
FIG. 4 is a block diagram of a method for sharing of optical network terminals in a PON, in accordance with various embodiments of the present invention.

In another aspect, the present invention provides a method 300, as shown in FIG. 4, for sharing of optical network terminals (ONTs) 120. The method 300 is implemented in the passive optical network (PON) 100. The method 300 initiates at block 305. At 305, the method 300 includes providing a plurality of ONTs 120 adapted to provide multiple data and voice related to services to various devices 135 pertaining to different subscribers. As explained in conjunction with FIG. 2, each of the ONTs includes communication modules available in conventional ONTs besides the uniquely configured modules, as envisaged by the present invention. Particularly, the conventional communication modules include at least one receiver adapted to receive optical signals from the service provider through their respective OLTs 110, and a de-multiplexer operatively coupled to the at least one receiver to de-multiplex the optical signals into its component signals. The ONTs 120 further include at least one transmitter coupled to the de-multiplexer for transmitting the de-multiplexed component signals to various subscribers. The ONTs 120 also include at least one output port communicably coupled to the at least one transmitter. The method further includes, at 310, providing a plurality of routers 130 operatively coupled to each of the plurality of ONTs 120. Particularly, each of the routers 130 is coupled to respective output port of the ONTs 120. Further, the method includes, at 315, configuring at least one broadcast domains at the at least one output port of each of the ONTs 120 so as to enable sharing thereof. Particularly, as explained earlier, the present invention envisages that at least one broadcast domains are configured by configuring one or more VLAN domains at the at least one output ports of each of the ONTs 120. More particularly, the one or more VLAN domains are configured by implementing VLAN Trunking protocol at the at least one output ports.

Further, the method at 320 includes providing a plurality of subscriber devices 135 communicably coupled to each of the plurality of routers 130. Each of the routers 130 may be communicably coupled to the plurality of subscriber devices 135 over a wired or wireless link. Particularly, the access ports 136 of the routers 130 are coupled to the subscriber devices 135 over wired or wireless link, as shown in FIG. 3.

The method at 325 includes each of the routers 130 routing the de-multiplexed component signals, received from corresponding ONT of the plurality of ONTs 120, to plurality of subscriber devices 135 communicably coupled to each of the routers 130. The subscriber devices 135 pertain to different subscribers, as described earlier. More specifically, each of the routers 130 configures service set identifiers (SSIDs) for identification thereof for enabling communication with plurality of subscriber devices, as explained earlier.

The method 300 concludes at 330 with the de-multiplexed component signal being received by the subscriber devices 135 for providing multiple data and voice services to the different subscribers.

In this manner, the system 100 and method 300 of the present invention is useful in providing many more services (up to 8 services) to the subscribers per port. Accordingly, using the system 100 and the method 300 almost all telecom based services can be provisioned over the PON infrastructure. Further, the system 100 and method 300 allow a better utilization of the resources present in the present day network architectures. Furthermore, the system 100 and method 300 provides lower per customer cost for providing the multiple services thereto. Moreover, the system 100 and method 300 allow better bandwidths in the PONs as compared to other fixed line technologies. In addition, the system 100 and method 300 improve the usage of Dynamic Bandwidth Allocation technology in the present PONs, especially at Gigabyte PON (GPON) levels.

Further, the present invention should not be construed to be limited to the configuration of the system 100 as described herein only. Various configurations of the system are possible which shall also lie within the scope of the present invention.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

I claim:

1. A system for sharing multiple voice and data related services to a plurality of subscriber devices using each output port of optical network terminals (ONTs) in a passive optical network, the system comprising:
   a plurality of ONTs that provide multiple voice and data related services from various service providers to a plurality of subscribers, each of the plurality of ONTs comprising:
      at least one receiver that receives an optical signal from a service provider,
      a de-multiplexer coupled to the at least one receiver to de-multiplex the optical signal into a plurality of component signals, wherein a component signal of the plurality of component signals includes a service set identifiers (SSIDs) for configuring at each of a plurality of routers to enable communication with a plurality of subscriber devices,
      at least one transmitter coupled to the de-multiplexer for transmitting the plurality of component signals to the plurality of subscribers, and
      a plurality of output ports coupled to the at least one transmitter;
   the plurality of routers operatively coupled to the plurality of output ports of each of the plurality of ONTs, wherein each of the plurality of routers routes the component signal of the plurality of component signals, received from a corresponding ONT of the plurality of ONTs, to a subscriber of the plurality of subscribers; and
   the plurality of subscriber devices communicably coupled to each of the plurality of routers, wherein the plurality of subscriber devices receive the component signal routed by a corresponding router and provide multiple voice and data related services to the plurality of subscriber devices;
   wherein each of the plurality of ONTs configures at least one broadcast domain at the plurality of output ports in each of the plurality of ONTs to enable sharing of the each of the plurality of ONTs between the plurality of subscribers, wherein each of the plurality of routers configures the SSIDs for identification of the at least one broadcast domain configured at the at least one output port of each of the plurality of ONTs and for enabling communication with the plurality of subscriber devices, wherein the SSIDs are mapped to a plurality of virtual local area networks (VLANs) configured at the output ports of the each of the plurality of ONTs for providing multiple voice and data related services from the various service providers.

2. The system as claimed in claim 1, wherein each of the plurality of routers comprises at least one input port communicably coupled to an output port of the plurality of output ports of the corresponding ONT of the plurality of ONTs by a cable.

3. The system as claimed in claim 2, wherein the cable is a CAT 5 cable.

4. The system as claimed in claim 2, wherein the cable is a CAT 6 cable.

5. The system as claimed in claim 1, wherein the at least one broadcast domain comprises one or more virtual local area networks (VLANs).

6. The system as claimed in claim 5, wherein each of the plurality of ONTs is configured to implement VLAN trunking protocol at the plurality of output ports thereof so as to configure the one or more VLANs.

7. The system as claimed in claim 1, wherein each of the plurality of routers is a wireless router.

8. An optical network terminal (ONT) for sharing multiple voice and data related services to a plurality of subscriber devices using each output port of the ONT in a passive optical network, the ONT comprising:
   at least one receiver that receives an optical signal from a service provider;
   a de-multiplexer coupled to the at least one receiver to de-multiplex the optical signal into a plurality of component signals, wherein a component signal of the plurality of component signals includes a service set identifiers (SSIDs) for configuring at each of a plurality of routers to enable communication with a plurality of subscriber devices;
   at least one transmitter coupled to the de-multiplexer for transmitting the plurality of component signals to the plurality of subscribers; and
   a plurality of output ports communicably coupled to the at least one transmitter, wherein the plurality of output ports communicably couple the ONT to the plurality of routers, and wherein the ONT configures at least one broadcast domain at the plurality of output ports to enable sharing of the ONT between the plurality of subscriber devices,
   wherein the plurality of routers routes a component signal of the plurality of component signals to a subscriber of the plurality of subscribers, wherein each of the plurality of routers configures the SSIDs for identification of the at least one broadcast domain configured at the at least one output port of each of the plurality of ONTs and for enabling communication with the plurality of subscriber devices, wherein the SSIDs are mapped to a plurality of virtual local area networks (VLANs) configured at the output ports of the each of the plurality of ONTs for providing multiple voice and data related services from the various service providers.

9. The ONT as claimed in claim 8, wherein the at least one broadcast domain comprises one or more virtual local area network (VLAN) domains at the plurality of output ports thereof.

10. The ONT as claimed in claim 9, wherein each of the plurality of ONTs is configured to implement VLAN trunking protocol at the plurality of output ports thereof so as to configure the one or more VLAN domains.

11. A method for sharing multiple voice and data related services to a plurality of subscriber devices using each output port of optical network terminals (ONTs) in a passive optical network, the method comprising:
   providing a plurality of ONTs that provide multiple voice and data related services from various service providers to a plurality of subscribers, each of the plurality of ONTs comprising:
      at least one receiver that receives an optical signal from a service provider;
      a de-multiplexer coupled to the at least one receiver to de-multiplex the optical signal into a plurality of component signals, wherein a component signal of the plurality of component signals includes a service set identifiers (SSIDs) for configuring at each of a plurality of routers to enable communication with a plurality of subscriber devices;
      at least one transmitter coupled to the de-multiplexer for transmitting the plurality of component signals to the plurality of subscribers, and a plurality of output ports coupled to the at least one transmitter;

providing the plurality of routers operatively coupled to each of the plurality of ONTs through the plurality of output ports thereof;

configuring at least one broadcast domain at the plurality of output ports of each of the plurality of ONTs so as to enable sharing of the ONTs between the plurality of subscribers;

providing a plurality of subscriber devices communicably coupled to each of the plurality of routers;

routing the component signal of the plurality of the component signals, received from a corresponding ONT of the plurality of ONTs, to a subscriber of the plurality of subscribers through a corresponding router of the plurality of routers to the plurality of subscriber devices, wherein routing the component signal to the plurality of subscriber devices comprises:

configuring the SSIDs at each of the plurality of routers for identification of the at least one broadcast domain configured at the at least one output port of each of the plurality of ONTs and enabling communication with the plurality of subscriber devices, wherein the SSIDs are mapped to a plurality of virtual local area networks (VLANs) configured at the output ports of the each of the plurality of ONTs for providing different services from the various service providers; and receiving the component signals routed by the corresponding router and providing multiple voice and data related services to the subscriber.

12. The method as claimed in claim 11, wherein configuring at least one broadcast domain comprises configuring one or more virtual local area network (VLAN) domains at the plurality of output ports of each of the plurality of ONTs.

13. The method as claimed in claim 12, wherein configuring the one or more VLAN domains is facilitated by implementing VLAN trunking protocol at the plurality of output ports of each of the plurality of ONTs.

\* \* \* \* \*